United States Patent

Loy et al.

[15] 3,684,129
[45] Aug. 15, 1972

[54] SORTER FOR AEROSOL VALVES AND OTHER CLOSURES HAVING ATTACHED TUBES OR OTHER SIMILAR CONFIGURATIONS

[72] Inventors: Alfred Loy; Harold Paitchell; Kazmier Wysocki, 293 Hudson St., all of Hackensack, N.J. 07601

[73] Assignee: said Wysocki, by said Loy and Paitchell

[22] Filed: Aug. 12, 1970

[21] Appl. No.: 63,053

[52] U.S. Cl. .................................................. 221/167
[51] Int. Cl. ................................................... B23q 7/12
[58] Field of Search ...... 221/160, 161, 162, 163, 164, 221/165, 167, 168

[56] References Cited

UNITED STATES PATENTS 2,116,398  5/1938  Makenny ............... 221/167 X
3,407,964  10/1968  Wysocki et al. ............ 221/167

Primary Examiner—Robert B. Reeves
Assistant Examiner—Thomas E. Kocovsky
Attorney—Raymond N. Matson

[57] ABSTRACT

A sorter and orienting device for elongated aerosol valves and other special closures which have dip tubes, extensions, or other mechanical components of similar shape, etc., and are haphazardly arranged in a bin, having an inclined, rotatable disk bottom having circumferentially spaced, radially directed slots upwardly through which cam-actuated vertically disposed baffles are projected to pick up one or more valves and orient them by gravity while elevating them to pick-off rails in which area the baffles are withdrawn to present a smooth surface for an orienting bar and pick-off rails to ride against.

14 Claims, 9 Drawing Figures

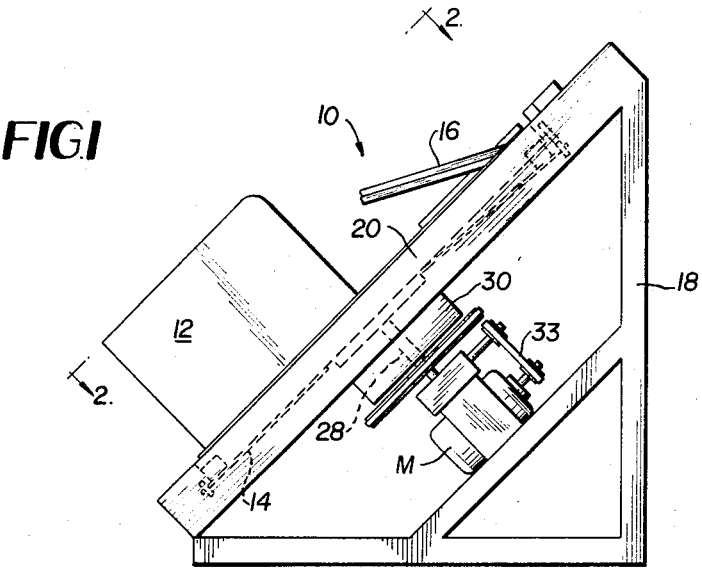
FIG.1
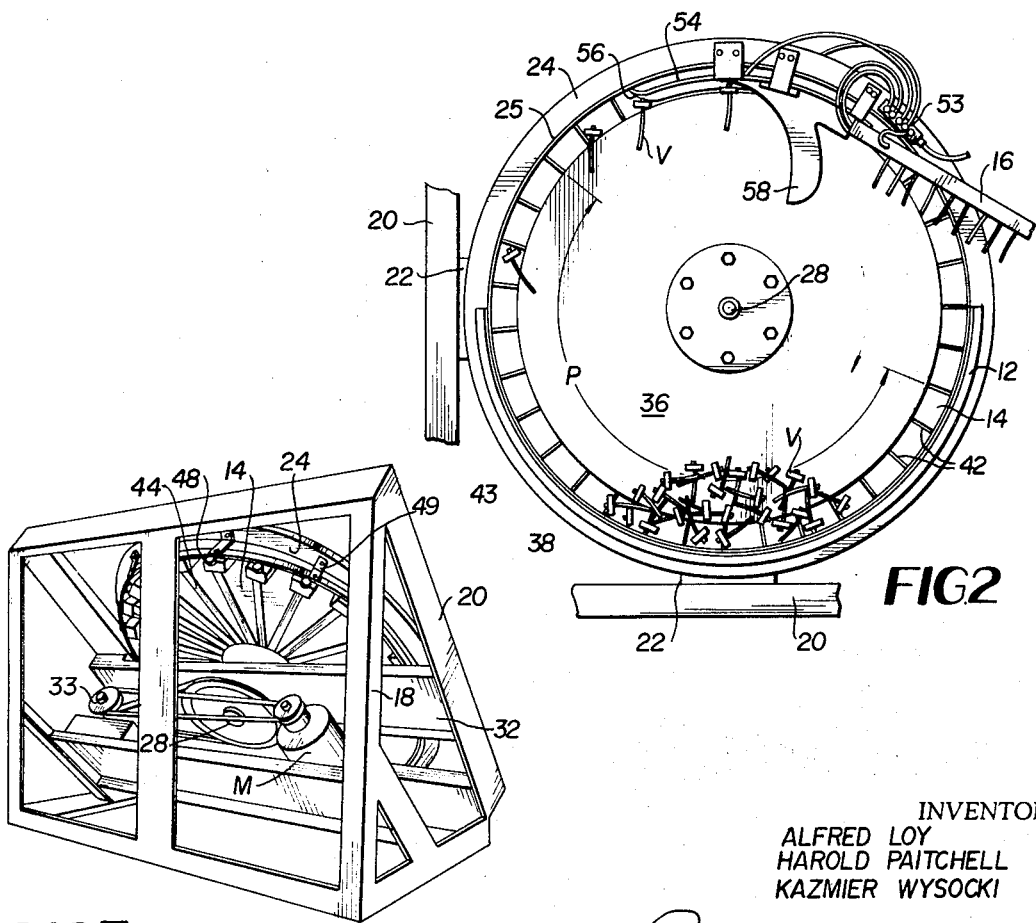
FIG.2
FIG.3
INVENTORS
ALFRED LOY
HAROLD PAITCHELL
KAZMIER WYSOCKI
BY Raymond N. Matson
THEIR PATENT AGENT

INVENTORS
ALFRED LOY
HAROLD PAITCHELL
KAZMIER WYSOCKI

BY Raymond N. Matson
THEIR PATENT AGENT

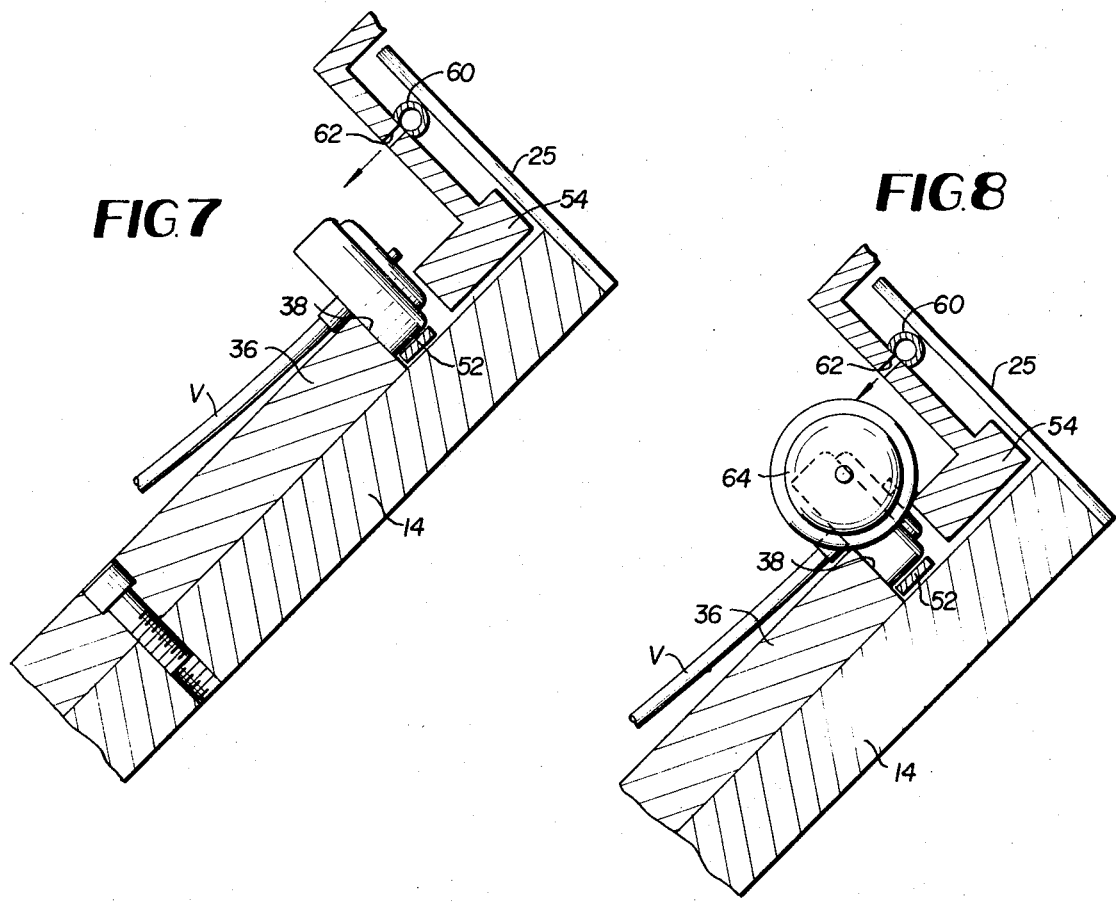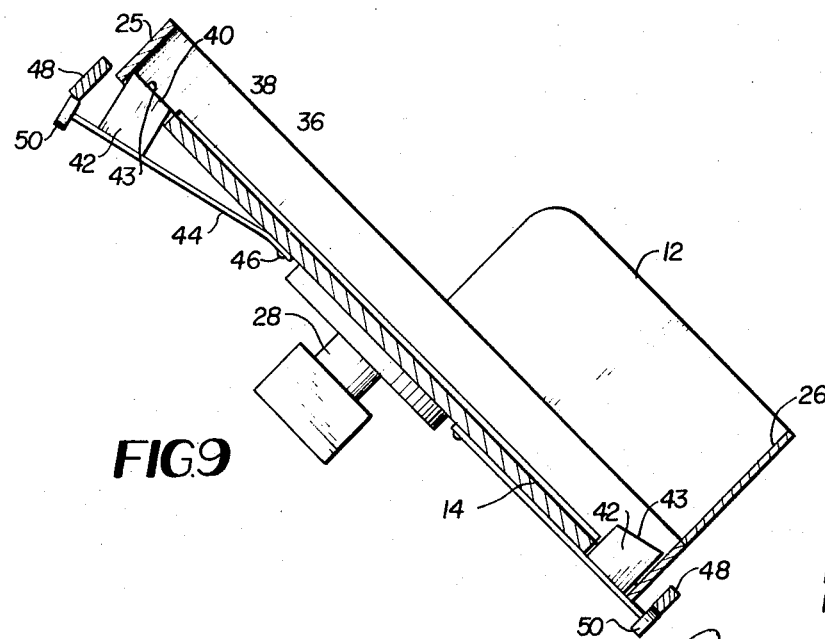

3,684,129

SORTER FOR AEROSOL VALVES AND OTHER CLOSURES HAVING ATTACHED TUBES OR OTHER SIMILAR CONFIGURATIONS

This invention relates generally to sorting apparatus and more particularly to an apparatus for sorting or orienting elongated aerosol valves and other special closures which have dip tubes, extensions, or other mechanical components of similar shape, etc., and which are haphazardly arranged in a supply bin, and delivering them in an oriented aligned position to a point of discharge.

Apparatus of this general type is known in the art and examples thereof are Benichasa U.S. Pat. No. 3054170, dated Sept. 18, 1962, and Wysocki et al. U.S. Pats. No. 3352455, dated Nov. 14, 1967, and U.S. Pat. No. 3407964, dated Oct. 29, 1968. As disclosed by these Patents, a supply of randomly arranged valve assemblies are picked up from a hopper by magnetic means and cups respectively arranged on a rotating disc and delivered in oriented position to the pick-off rails of a chute which delivers them to a valve inserting apparatus. Each of the aforegoing devices have been extremely efficient in operation.

The main object of the present invention is to provide a sorting and orienting device of the type described which is even more efficient in operation than such known devices in incorporating a novel structure having a high efficiency valve pick-up and transference to the discharge chute pick-off rails with a low rotational speed of the pick-up disk to thus avoid abrasive damage or marring of the aerosol valves as occurs with sorters that rotate at higher speeds.

An important object of the present invention is to provide an improved sorting and orienting apparatus which employs projected baffles in an inclined rotating disk to efficiently pick up aerosol valves from a supply bin and retracts the baffles at the pick-off rails transfer area to eliminate any possibility of mechanical jamming and resultant damage to the valves.

Another important object of the present invention is to provide an improved sorting and orienting apparatus of the type described which, with minor modifications, may be easily adapted for use with many different types of valves, and closures and components.

Other objects and advantages of the invention will become apparent during the course of the following description.

In the drawings, we have shown one embodiment of the invention. In this showing:

FIG. 1 is a side elevational view of the invention;

FIG. 2 is a top plan view of the invention to an enlarged scale looking along the line 2—2 of FIG. 1;

FIG. 3 is a rear elevational view to a reduced scale showing the drive means thereof;

FIG. 7 is an identical view of a different valve body with a large head showing a thinner pick-off rail;

FIG. 8 is a similar view showing a valve in disoriented position and about to be displaced by an air jet; and FIG. 9 is a vertical, sectional diagrammatic view showing how the cam track permits the projection of the baffles at the bottom half of the disk and forces the retraction thereof at the upper half.

Figure 4:
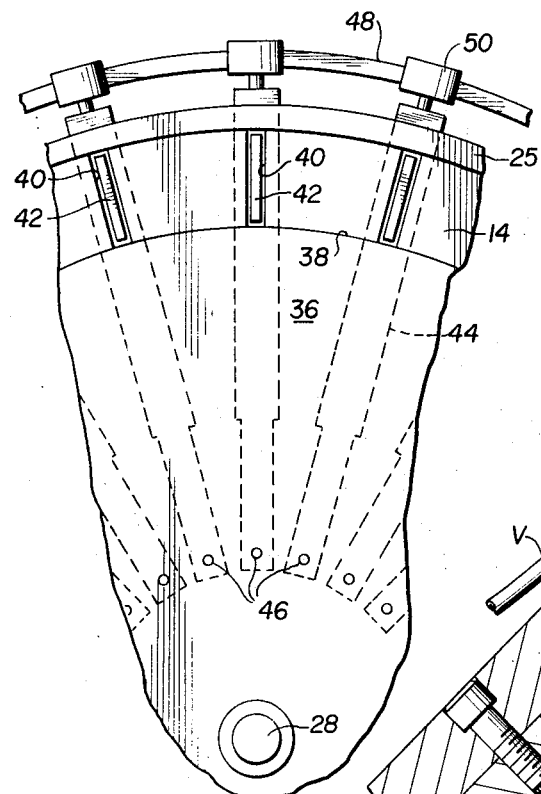
FIG. 4 is a fragmentary top plan view to a greatly enlarged scale showing the pocket-forming baffles and their rollers and the actuating cam track, parts being omitted for clarity.
Figure 6:
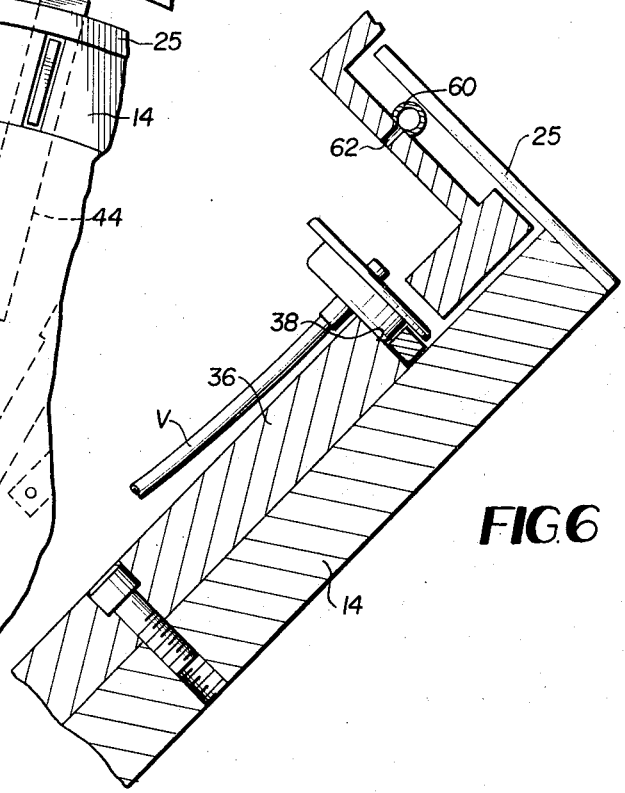
FIG. 6 is a fragmentary, vertical, cross-sectional view of an oriented valve engaging the lower one of the pick-off rails of the discharge chute at the top of the disk just before passing under the hold down bar, parts being omitted for clarity.
Figure 5:
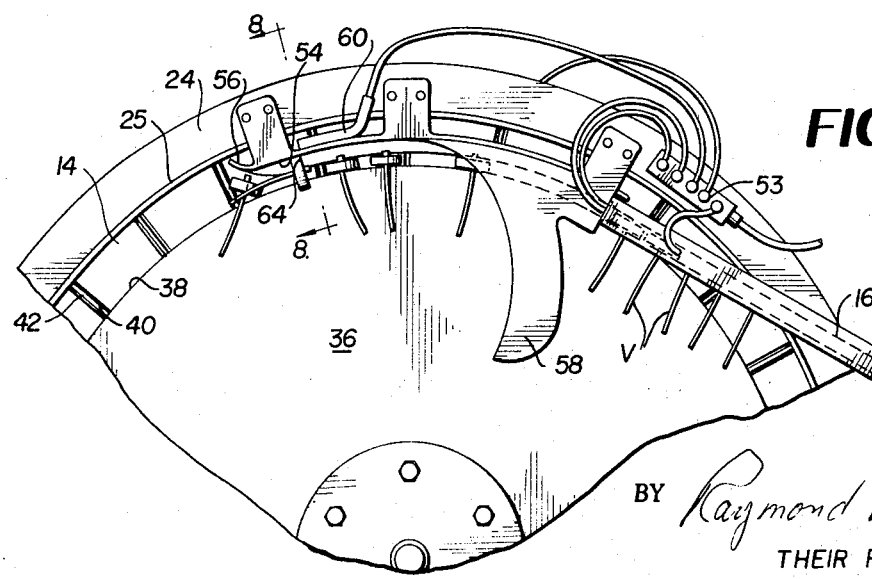
FIG. 5 is a similar view to a reduced scale showing the air manifold, the hold down bar and safety shoe, and the pick-off chute.

Referring to the drawings, numeral 10 designates the sorter and orienting apparatus as a whole which comprises an inclined hopper 12, a rotatable, valve assembly elevating disk 14, a pick-off chute 16, and a supporting frame 18.

As shown in FIGS. 1–3 inclusive, the frame 18 supports an inclined rectangular frame 20 at an angle of approximately 45°, the inclined frame 20 in turn suitably supporting a parallelly disposed ring 24 by means of spaced straps 22. The angle may be changed to obtain optimum operation with different valves or components. The hopper 12 includes an arcuate wall 26 open at its upper side which is mounted on the ring 24 so that their lower edges are coplanar.

The disk 14 includes an upstanding peripheral flange 25 and is of slightly less diameter than and concentrically and coplanarly mounted within the ring 24 on a shaft 28 which is suitably mounted in a bearing 30 fixed to a bar 32 of the frame 18. Rotation of the disk 14 is effected by a variable speed, frame mounted motor M through the shaft 18 by belts and pulleys generally indicated by the numeral 33.

The valve assembly orienting disk 14 is preferably formed of aluminum and is provided with a facing layer 36 of composition material, stainless steel or non-marking plastic, depending upon the material used for the valve bodies, so as to not mar of scuff valve assemblies. The facing layer 36 terminates in an edge 38 at a point spaced from the peripheral flange 25 of the disk 14.

The uncovered portion of the disk 14 between the facing layer edge 38 and the flange 25 is provided with vertically disposed, radially directed slots 40 at circumferentially spaced points (FIGS. 2, 4, 5 and 9). A baffle 42 having an upper tapered edge 43 is positioned within each of the slots 40 and is attached to and adjacent the outer end of a flat spring 44 of any suitable material mounted as at 46 on the bottom of the disk 14 (FIG. 4). The distance that a baffle 42 can project upwardly through slot 40 is determined by a cam track 48 mounted by straps 49 on the ring 24 and a cam roller 50 rotatably mounted on the end of each baffle supporting spring 44.

As is diagrammatically shown in FIG. 9, the baffles 42 are forced downwardly against the action of the springs 44 by the cam track's engagement with the rollers 50 as the valve sorter disk 14 rotates and the baffles move from a lower point to a higher point. The actual area portion of the disk during which the baffles project upwardly therethrough is shown by the arcuate line P in FIG. 2. Thus, the baffles form valve receiving pockets in the P area which elevate the valves to the transfer area (pick-off chute 16) where the baffles are fully retracted to eliminate any possibility of mechanical jamming and damage.

The pick-off chute 16 which is supported by a bracket on the ring 24 extends generally tangentially from a point adjacent the highest point of travel of the facing edge 38, downwardly at an angle of about 15 degrees, and outwardly to a point of discharge which may be the source of supply for valve inserting apparatus, etc. The chute 16 comprises a pair of closely and laterally spaced, parallel rails 52 along which the valves are moved by air jets from an air source 53, in aligned oriented position with their dip tubes or extensions depending between the rails as shown.

It will be noted that the disk 14 functions as the bottom of the hopper 12 so that upon rotation of the disk by the motor M in the rotation of the arrow, the valves V contained in the hopper will drop by gravity into the pockets 44 temporarily formed in the P area by the baffles 42. Several factors enter into the orienting of the valves as they are elevated by the rotating disk 14. They have a natural tendency to hang vertically because of their long dip tube and to position themselves against the face of the disk facing layer 36 with their bodies engaging the facing edge 38 (FIGS. 2 and 5-8).

As the valves V leave the P area they are engaged by a top orienting bar 54 having an inclined face 56 which deflects the valve body, if needed, into the position shown at the highest point of the disk where it lies against one of the pick-off rails 52. Dislodging of the valve assembly upwardly is prevented by a hold-down bar 58 which terminates at and is aligned with the other pick-off rail. An air manifold 60 provided with jet openings 62 is mounted on the top orienting bar 54 in order to dislodge improperly positioned valves such as that indicated as 64 (FIGS. 5 and 8) which valves merely drop back into the hopper.

The operation of the sorting and orienting device comprising the present invention is believed to be apparent. Elongated valve assemblies V are continuously fed by suitably controlled apparatus (not shown) to the hopper 12 so as to maintain an adequate, randomly arranged supply therein as the disk 14 is rotated by the motor M. The disk rotates at an extremely low speed — 2 to 5 r.p.m. — which is very desirable in that the caps, valves, or components are not damaged or marred, as in other sorters that operate at higher speeds. Due to the retracting baffles which form very efficient pockets for pick-up of the valves and the easy orientation afforded by the facing edge 38, feed rates from the pick-off chute 16 of up to 300 to 500 valves per minute are obtainable as compared to 100 to 150 per minute on some prior art devices.

As the disk 14 rotates under the supply of valves in the hopper 12, the bodies of the valve assemblies V drop onto the disk liner 36 into the pockets formed by the baffles 42 which are fully projected (FIGS. 2 and 9). The baffles elevate the valves to the pick-off rail 52 of the chute 16 where the pocket forming baffles are retracted, as explained, the valve assemblies are self oriented by gravity due to the weight of their dip tubes or extensions which action is somewhat enhanced by the natural and indirect vibration imparted by the operation of the apparatus. The valves then move under the top orienting bar 54 (or are blown off by the air jets), behind the hold-down bar 58, and are smoothly transferred to the pick-off chute.

The term valve assemblies is intended to mean elongated valve bodies, bodies with dip tubes, and to include any other components having similar shapes or proportions.

It is to be understood that the form of the invention herewith shown and described is to be taken as a preferred example of the same and that various changes in the shape, size and arrangement of parts may be resorted to without departure from the spirit of the invention or the scope of the subjoined claims.

What is claimed is:

1. A sorter for delivering oriented and aligned valve bodies having dip tubes from a bin containing a randomly arranged mass thereof to a discharge point comprising, in combination, a disk rotatable about an inclined axis and forming a part of the bottom of the bin; a plurality of circumferentially spaced recesses formed in said disk; means movable in said recesses to form adjacent valve body receiving pockets of greater diameter than the body of the valves when raised above the upper surface of said disk; a pick-off chute having spaced rails positioned adjacent said disk to engage the valve bodies received in said pockets when elevated by rotation of said disk and convey them to a discharge point; and means for rotating said disk to effect gravity deposit of the valve bodies into said pockets from the bin and depending of the dip tubes from their bodies in the pockets to orient them during rotary elevating movement of the pockets toward said pick-off chute.

2. The combination recited in claim 1 wherein said movable means comprises baffles mounted on said disc.

3. The combination recited in claim 2 wherein said baffles are resiliently mounted on said disc.

4. The combination recited in claim 2; and fixed means for effecting movement of said baffles in said recesses to form said pockets.

5. The combination recited in claim 4 wherein said fixed means comprises a cam track engaging said baffles.

6. The combination recited in claim 4 wherein said fixed means moves said baffles above and below the surface of said disc to respectively form said pockets and to avoid engagement with said pick-off chute.

7. The combination recited in claim 1, and a facing liner fixed to said disc and having an edge adjacent said recesses for supporting said valve bodies adjacent said pick-off chute.

8. The combination recited in claim 7; and a hold-down bar positioned adjacent said rails to prevent the dislodging of valve bodies from said edge.

9. The combination recited in claim 7; and a top orienting bar positioned adjacent said chute for guiding the valve bodies onto said rails.

10. The combination recited in claim 9; and air jets mounted on said bar for dislodging improperly positioned valve bodies.

11. The combination recited in claim 7 wherein said movable means comprises baffles mounted on said disk.

12. The combination recited in claim 11; and fixed means for effecting movement of said baffles in said recesses to form said pockets.

13. The combination recited in claim 12 wherein said fixed means comprises a cam track engaging said baffles.

14. The combination recited in claim 12 wherein said fixed means moves said baffles above and below the surface of said disc to respectively form said pockets and to avoid engagement with said pick-off chute.

* * * * *